United States Patent  [15] 3,660,031
Holcombe, Jr. et al.  [45] May 2, 1972

[54] METHOD FOR PREPARING BORON SUBOXIDE

[72] Inventors: Cressie E. Holcombe, Jr.; Ottis J. Horne, Jr., both of Oak Ridge, Tenn.

[73] Assignee: The United States of America as represented by the United States Atomic Energy Commission

[22] Filed: Mar. 9, 1971

[21] Appl. No.: 122,506

[52] U.S. Cl. .................................. 23/204 R, 23/149, 75/86
[51] Int. Cl. ....................................................... C01b 35/00
[58] Field of Search .............................. 23/149, 204; 75/86

[56] References Cited

OTHER PUBLICATIONS

Searcy et al., " Journal of Physical Chemistry," Vol. 61, July, 1957, pp. 757– 960.

Primary Examiner—Herbert T. Carter
Attorney—Roland A. Anderson

[57] ABSTRACT

Boron suboxide ($B_7O$) is prepared by the reduction of zinc oxide with boron in an inert atmosphere at a temperature of 1,200°–1,500 C.

3 Claims, No Drawings

METHOD FOR PREPARING BORON SUBOXIDE

The present invention relates to the preparation of boron suboxide ($B_7O$) by reducing zinc oxide with boron. This invention was made in the course of, or under, a contract with the U. S. Atomic Energy Commission.

Boron suboxide ($B_7O$) is a highly refractory material characterized by its extreme hardness (average Vickers hardness of 3,820 kg/mm$^2$ at a 100-g load), resistance to oxidation and acids, low density of approximately 2.80 g/cc, and a decomposition temperature above about 1,750° C. These properties make this material suitable for use on surfaces subject to abrasion, e.g., grinding wheels, drill bits, machine tools, etc., and in structures employed in high temperature applications.

Several techniques have been previously employed for producing boron suboxide and include such procedures as reducing boron oxide ($B_2O_3$) with boron, magnesium, or silicon, or by reducing magnesium oxide with boron. With each of these known procedures there are attendant shortcomings or drawbacks which detract from the usefulness of the procedure in the production of $B_7O$. For example, one of the more successful procedures involves the reduction of molten $B_2O_3$ with boron, but the high volatilization and vapor pressure of this oxide at the reaction temperatures of 1,200°–1,500° C. respectively increase the likelihood of producing non-stoichiometric $B_7O$ and inhibit the sealing of the reaction vessel. Also, the molten $B_2O_3$ reacts with the metal or ceramic reaction vessel and thereby contaminates the $B_7O$. With respect to other known procedures, the reduction of $B_2O_3$ with magnesium produces a solid solution of magnesium and magnesium boride contaminants in the suboxide while the reduction of magnesium oxide with boron produces only a relatively small yield of $B_7O$ and is very inefficient.

It is the primary aim or objective of the present invention to provide a method of preparing $B_7O$ that does not suffer the above and other shortcomings or drawbacks associated with the previously known techniques of producing $B_7O$. This goal is achieved by reducing zinc oxide with boron at a temperature adequate to effect the reduction reaction. The reaction forms boron suboxide $B_7O$ and a reaction by-product of metallic zinc which is volatile at the reaction temperature.

Other and further objects of the invention will be obvious upon an understanding of the illustrative method about to be described, or will be indicated in the appended claims, and various advantages not referred to herein will occur to one skilled in the art upon employment of the invention in practice.

Generally described, the method of the present invention is directed to the preparation of boron suboxide ($B_7O$) having a theoretical composition of 82.25 weight percent (wt %) boron and 17.75 wt % of oxygen. The method is practiced by blending zinc oxide powder and boron powder, loading the blended powders into a ceramic or refractory metal reaction vessel and then confining the loaded vessel in a suitable furnace within which a flowing stream of an inert gas such as argon, helium, and the like, or vacuum may be used to form the furnace atmosphere. The powders are heated in the presence of an inert atmosphere to a temperature in the range of 1,200°–1,500° C. to effect a reduction of the zinc oxide by the boron in accordance with the following reaction:

$$ZnO + 7B \xrightarrow{heat} B_7O + Zn\uparrow$$

During this reaction boron suboxide and metallic zinc are formed with the zinc, the reaction by-product, being volatilized at the reaction temperature to effect its removal from the $B_7O$ and from the furnace by the flowing gas stream or vacuum so as to leave a product of highly pure $B_7O$. A solid solution of zinc does not occur in the boron suboxide.

The quantities of boron and zinc oxide powders employed in the reaction are preferably such as to provide a stoichiometric ratio, but an excess of boron may be used without suffering deleterious results. The size of powder found satisfactory for the reaction is 0.03 to 0.05 micron for the boron and 0.25 to 1.05 microns for the zinc oxide. The boron suboxide powder produced by the reduction reaction is in a size range of 0.44 to 3.3 microns. The duration of the reaction at the reaction temperature is dependent upon the quantity of powders used and should be sufficiently long to assure volatilization of virtually all if not all of the zinc in the reactants.

In order to provide a better understanding of the method of present invention an illustrative example of preparing boron suboxide is set forth below.

EXAMPLE

A mixture was prepared by blending 10.61 grams of commercial zinc oxide powder (reagent grade) having an average particle size of 0.56 micron with 10.0 grams of amorphous boron powder (purity 99+ wt %) having an average particle size of 0.0363 micron. The blended powders were isostatically pressed at 20,000 psi into a pellet having a diameter of about 1 inch and a length of about 2 inches. The pressed pellet was placed in an aluminum oxide ($Al_2O_3$) boat and inserted into a silicon carbide resistance furnace equipped with a mullite tube. An inert atmosphere of argon was provided inside the furnace by flowing the argon through the mullite tube at a moderate flow rate. The temperature of the furnace was increased to 1,500° C. at a rate of increase of about 300° C. per hour. The reduction of the zinc oxide began at about 1,200° C. The flowing argon carried the gaseous zinc from the reacting pellet to a collection system, consisting of a bubbler filled with mineral oil. The furnace temperature was held at 1,500° C. for about 4 hours to completely react the zinc oxide and boron to form boron suboxide and metallic zinc. The suboxide was cooled and removed from the furnace. Chemical and spectrometric analyses of the product indicated a composition of 82.2 wt % boron, 17.27 wt % oxygen, and less than 1.0 wt % phosphorus. The elemental chemical analysis compares favorably with the aforementioned theoretical composition for $B_7O$. No zinc was detected as an impurity in the boron suboxide product. The analytical data indicates a product purity of 96.74 wt % with no refinement of the method.

It will be seen that the present invention provides an improved method of preparing boron suboxide which readily lends itself to large scale production. The metallic zinc liberated during the reaction does not react with the material forming the reaction vessel and can be readily reclaimed. With the removal of the zinc during the reaction it is possible to prepare $B_7O$ powder of high purity by using starting materials within minimal amounts of impurities.

What is claimed is:

1. A method of preparing boron suboxide having the formula $B_7O$, comprising the steps of admixing particulate boron of a size in the range of 0.03 to 0.05 micron and particulate zinc oxide of a size in the range of 0.25 to 1.05 microns, confining the admixture in a volume, subjecting the volume to an inert atmosphere, and heating the admixture to a temperature in the range of 1,200°–1,500° C. to effect a reaction between the boron and zinc oxide for reducing the zinc oxide to gaseous metallic zinc and forming the boron suboxide.

2. The method of preparing boron suboxide as claimed in claim 1, wherein the admixture consists essentially of a stoichiometric ratio of boron and zinc oxide.

3. The method of preparing boron suboxide as claimed in claim 1, wherein the step of subjecting the volume to an inert atmosphere is provided by a stream of inert gas movable through said volume, and wherein the gaseous metallic zinc is contacted by the inert gas and removed from said volume.

* * * * *